Feb. 4, 1964 G. LAFAY 3,120,132
DEVICE FOR MONITORING THE DRIVING TORQUE AND THE ANGULAR
POSITIONS OF A ROTATING MEMBER
Filed Jan. 23, 1961
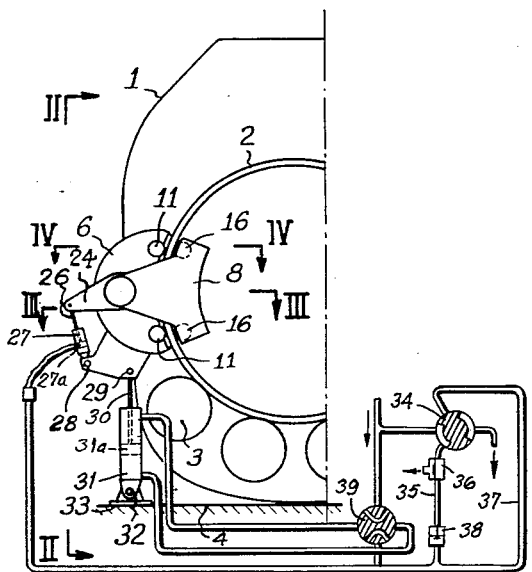
Fig. 1
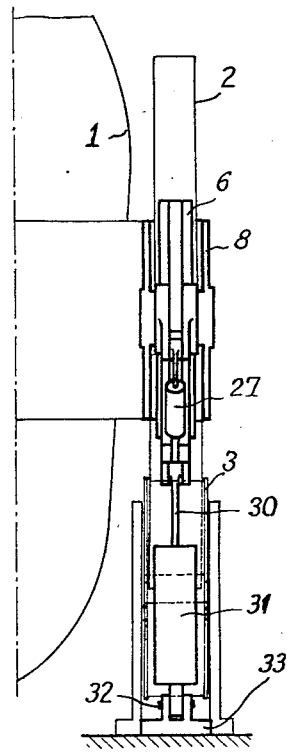
Fig. 2
Fig. 3
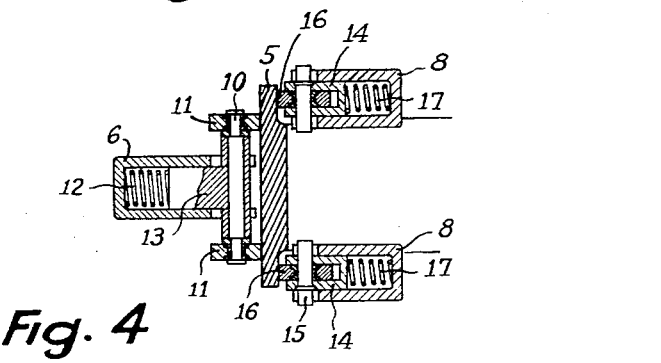
Fig. 4

United States Patent Office 3,120,132
Patented Feb. 4, 1964

3,120,132
DEVICE FOR MONITORING THE DRIVING TORQUE AND THE ANGULAR POSITIONS OF A ROTATING MEMBER
Georges Lafay, Le Creusot, Saone-et-Loire, France, assignor to Societe des Forges et Ateliers du Creusot, Paris, France, a company of France
Filed Jan. 23, 1961, Ser. No. 84,338
Claims priority, application France Jan. 26, 1960
4 Claims. (Cl. 74—165)

The present invention relates to a device for monitoring the driving torque and the angular positions of a rotating member, said device being more particularly intended to increase the handling security of high capacity tilting vessels as for example the steel converters.

It is known that such vessels, the reciprocating motion of which in both directions is controlled through a demultiplicated driving gear, are to be actuated at full load, at reduced load and with no-load; the normally resisting torque may then invert its direction during a tilting motion or at stillstand and the jerks due to play and elasticity in the driving gear imply an indisputable danger in the particular case of the steel converters.

Whichever are the load conditions and what may be the position of a tilting vessel the device of the invention allows for preventing the jerks due to a load fluctuation; moreover it allows to control angular motions of the vessel at reduced speed.

According to the present invention, the device includes—coupled with a jack swivelling around a fixed pin—a brake or friction grip mechanism including at least two shoes opposed to each other, internally and externally of a rim locked to the rotating member, respectively, said friction grip mechanism being controlled by a second jack the simultaneous action thereof on the brake shoe assembly may provide, on the one hand an adjustable braking effect ensuring the irreversibility of the resisting torque and, on the other hand, the locking of the brake in order to transmit to the rotating member, angular motions of a limited amplitude controlled by the first jack.

In the attached drawing we have shown, and hereafter we have described a preferred embodiment of a device according to the invention, applied to a steel works converter—

In the drawing:

FIG. 1 is a schematic sectional view of the device assembly for a converter shown as a fragmentary detail.

FIG. 2 is a larger scale view taken on the line II—II of FIG. 1.

FIGS. 3 and 4 show on a larger scale sectional views taken on III—III and IV—IV of FIG. 1 respectively.

In the FIGS. 1 and 2 the fine line plotting partly shows a converter 1, bearing on two rings 2 in the usual way, said rings being supported on rollers 3 supported on a fixed base 4.

The rim 5 (FIG. 3) of one of the two rings 2 provides a rest to an external brake shoe 6 incorporating a friction lining 7 and, for two internal brake shoes 8 each incorporating a friction lining 9.

The brake shoe 6 carries two pins 10 (FIG. 4) each provided with two rollers 11 applied on rim 5 through a spring 12 actuating a slide block 13 supporting the pin 10 and guided in the brake shoe 6.

In the same manner, each of the brake shoes 8 carries two slide blocks 14 each supporting a pin 15 on which a roller 16 is applied against the rim 5 by means of a spring 17 acting on the slide block 14.

As is shown on FIG. 3 the brake shoe 6 is swivelled, through the roller bearings 18, on the central journal 19 of a shaft 20 while the two shoes 6 of the brake 8 are swivelled through roller bearings 21 on the end journals 22 of shaft 20.

On the intermediary journals 23 of the shaft 20, two levers 24 are keyed and coupled by means of a pin 25 on which is linked the rod 26 of a jack 27, the cylinder thereof being in turn linked at 28 on the brake shoe 6.

The journals 22 for the brake shoes 8 are off center in relation to the journal 19 for the brake shoe 6.

Through the gudgeon pin 29, the brake shoe 6 is coupled with the rod 30 of a second jack 31, the cylinder thereof being linked on a pin 32 resting on a support 33 clamped on the foundation.

In the stillstand position of the jack 27, the off center of the journals 22 and 23 causes the separation from rim 5 of the brake shoes 6 and 8, the orientation of which lining up towards the axis of rotation of converter 1 is ensured through the releasing action of the springs 12 and 17 on the corresponding rollers 11 and 16 in order to prevent any contact between the rim 5 and the friction linings 7 and 9.

The rotation of shaft 20, actuated by the jack 27 has for effect to bring to contact with the rim 5 in pressing on the springs 12 and 17, the brake shoes 6 and 8, the application pressure of which is balanced due to the possibility of the assembly to rotate on gudgeon pin 29 of the jack 31 which can itself oscillate on its fixed link pin 32.

The power value of the pressure admitted to the jack 27 corresponds to a specific braking action, in both rotation directions, on the rim 2 and consequently on the converter. Thus, it is possible to give to this braking action the value at which a resisting torque remains applied on the driving gear of the converter tilting, whichever may be the load contained into the converter and which may vary as the case may be. In this manner any torque reversion is prevented during the tilting motion of the converter and its stillstand as well.

The full pressure admitted to the jack 27 results in locking the brake shoes 6 and 8 on the rim 7, ensuring, on the one hand the stoppage of the converter 1 and, on the other hand, to impart to converter 1 through pressurizing the jack 31, angular motions of limited amplitude, under reduced speed in order to set the converter to the angular positions which are necessary to given operations.

In accordance with the patent statutes the principles of the present invention may be utilised in various ways, numerous modifications and alterations being contemplated it being understood that the embodiments shown in the drawings and described above are given merely for purpose of explanation and illustration without intending to limit the scope of the invention.

Thus, more particularly either jack may be hydraulically or air operated and safety devices may be provided in order to prevent undue interaction between locking brake and driving gear or in order to remedy to any possible brake failure.

It is also understood that the device of the invention may be applied for monitoring the motions or angular positions of one-way rotating members.

What I claim is:

1. A device for monitoring the driving torque and for stopping an element at angular positions during intermittent rotation thereof, a vessel to be rotated, a base for said vessel, a first jack pivoted to said base, a rim mounted on said vessel, a friction grip mechanism engaging said rim, said jack being coupled to said mechanism, shoes for said mechanism engaging the inner and outer surfaces of said rim and a second jack mounted on said mechanism, a shaft, means coupling said second jack to said shaft, and means on said shaft for actuating said shoes into and out of engagement with said rim whereby the braking action of said shoes prevents reversal of the resisting torque and locks said mechanism on said rim for limited angular movement of said vessel by said first jack.

2. A device as described in claim 1 including rollers for each shoe resiliently urged into engagement with said rim guiding said shoes concentrically with said rim and urging said shoes toward released position.

3. A device as described in claim 1, said mechanism including spaced levers, a shaft extending between said levers, eccentric journals on said shaft, said shoes being mounted on said eccentric journals and said second jacks rotating said levers and said shaft.

4. A device as described in claim 1, said shoes including a shoe engaging the external middle surface of said rim and a spaced pair of shoes engaging the internal surface of said rim adjacent the edges thereof.

References Cited in the file of this patent

UNITED STATES PATENTS

| | | |
|---|---|---|
| 296,161 | Grater | Apr. 1, 1884 |
| 855,271 | Bainbridge | May 28, 1907 |
| 1,203,408 | Reiny | Oct. 31, 1916 |
| 2,285,241 | Walther et al. | June 2, 1942 |
| 2,518,177 | Pulsford | Aug. 8, 1950 |
| 2,619,201 | Crookston | Nov. 25, 1952 |
| 2,870,639 | Suderow | Jan. 27, 1959 |